United States Patent [19]

Delloye et al.

[11] Patent Number: 4,634,569

[45] Date of Patent: Jan. 6, 1987

[54] DEVICE PERMITTING REDUCTION OF THERMOSIPHON EFFECTS IN FAST NEUTRON NUCLEAR REACTORS

[75] Inventors: Nicolas Delloye; Philippe Denimal, both of Jeumont, France

[73] Assignee: Jeumont-Schneider Corporation, Puteaux Cedex, France

[21] Appl. No.: 441,654

[22] Filed: Nov. 15, 1982

[30] Foreign Application Priority Data

Nov. 16, 1981 [FR] France ................. 81 21365

[51] Int. Cl.[4] ............................................ G21C 13/00
[52] U.S. Cl. ..................................... 376/203; 376/404
[58] Field of Search ............... 376/171, 203, 206, 291, 376/292, 404; 138/109; 277/207 A, 83, 173; 285/231, 345, 379, D18

[56] References Cited

U.S. PATENT DOCUMENTS

| 2,933,221 | 4/1960  | Rand et al. ............... 277/173   |
| 3,066,961 | 12/1962 | Gerin .................... 277/207 A  |
| 3,280,002 | 10/1966 | Hutter et al. ............. 176/36    |
| 3,324,007 | 6/1967  | Baxter .................... 376/203   |
| 3,554,568 | 1/1971  | Heid, Jr. ................. 277/173   |
| 3,764,151 | 10/1973 | Elder et al. .............. 277/207 A |
| 4,035,232 | 7/1977  | Kube ...................... 376/203   |
| 4,363,777 | 12/1982 | Cornu et al. .............. 376/203   |
| 4,400,345 | 8/1983  | Pierart et al. ............ 376/292   |

FOREIGN PATENT DOCUMENTS

| 0029781 | 6/1981 | European Pat. Off. . |
| 2154350 | 4/1973 | Fed. Rep. of Germany ...... 376/203 |
| 1579240 | 7/1969 | France . |
| 1579213 | 7/1969 | France . |
| 1084319 | 9/1967 | United Kingdom ................ 376/203 |

Primary Examiner—Deborah L. Kyle
Assistant Examiner—Richard W. Wendtland
Attorney, Agent, or Firm—Rines and Rines

[57] ABSTRACT

The present invention is intended to reduce thermosiphon effects within the annular space (6) situated between the pump casing (1) and the vertical wall (9) of an opening situated within the slab (3) covering the vessel for a nuclear reactor immersed in liquid sodium (4), with an inert gas (15) filling the space situated between the surface of the sodium and the bottom portion of said slab (3).

The device to which the present invention pertains consists of a floating ring (7) placed around the pump casing (1) and a disc (8) which is integral with the vertical wall (9) of the opening situated within the slab (3). The shape of the aforementioned ring (7) and the shape of the aforementioned disc (8) are complementary with one another.

Nuclear plants application.

3 Claims, 1 Drawing Figure

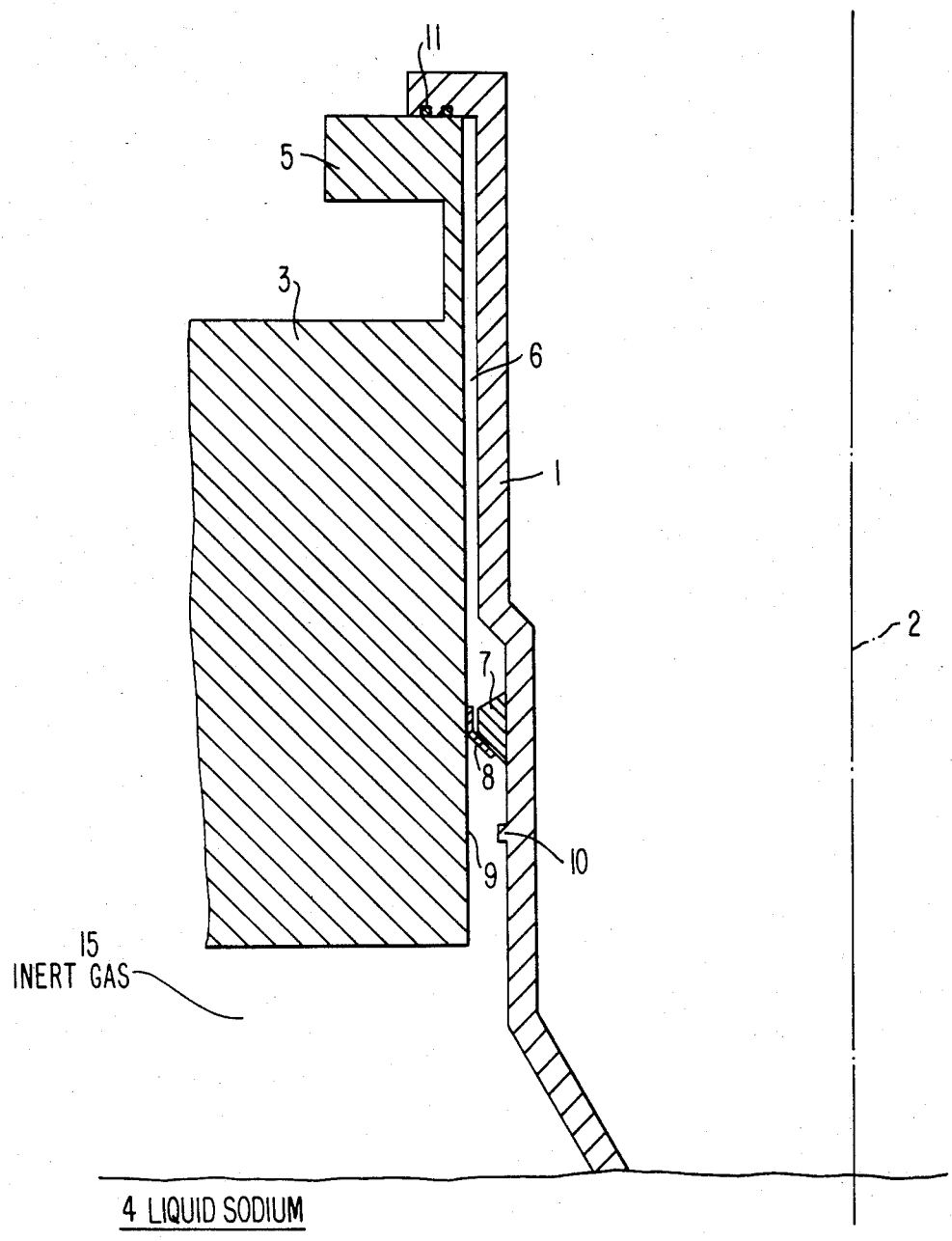

DEVICE PERMITTING REDUCTION OF THERMOSIPHON EFFECTS IN FAST NEUTRON NUCLEAR REACTORS

The present invention pertains to fast neutron nuclear reactors of the combined type. It is known that reactors of this type are placed inside vessels which contain liquid sodium at high temperatures. The vessel is sealed by means of a slab which is usually composed of concrete, and the space situated between the surface of the sodium and the bottom portion of the slab is filled with an inert gas, such as argon, in order to prevent contact between the sodium and the atmosphere.

An opening within the concrete slab is provided in order to ensure circulation of the liquid sodium, especially within the core of a reactor of the combined type, and a pump known as the primary pump is introduced through said opening, so that it may be immersed within the sodium. While the reactor is functioning, the inert gas possesses an extremely high temperature, for example 400° C., whereas the upper surface of the slab is at an ambient temperature. In addition, differences in temperature exist between the center of the vessel and the periphery, with the result that a thermosiphon effect is produced within the annular space situated between the upper portion of the pump casing and the vertical wall of the opening within the slab. Consequently, significant thermal imbalances develop along the pump casing, and curving of the axis tends to occur.

French Pat. No. 2,470,433 describes a device for sealing the aforementioned annular space, with said device consisting of an annular cup which is integral with the pump casing and is filled with liquid metal, as well as a toroidal ring possessing a ferrule immersed within said metal and a ring which rests freely upon a supporting surface attached to the vertical wall of the previously cited opening within the slab.

This type of device permits appropriate insulation of the annular space where convection movements within the gas usually occur.

Nevertheless, there are two significant difficulties in terms of handling the pump. On the one hand, the liquid metal, namely sodium, should not, under any circumstances, come into contact with the atmosphere, and, on the other hand, the temperature must always be kept above a specific threshold in order to maintain a liquid state.

The purpose of the present invention is to eliminate the previously cited difficulties by means of a device which permits reduction of thermosiphon effects within the aforementioned annular space. The device to which the invention pertains consists of a floating ring fitted around the pump casing and a disc which is integral with the vertical wall of the opening within the slab. The shape of the ring and the shape of the disc are complementary with one another, so as to form an impermeable seal.

The present invention, as well as other purposes, advantages, and characteristics of said invention, can be more fully understood in relation to the description provided hereinafter, which is accompanied by an illustration.

The sole illustration is a schematic representation, according to an axial section, of a primary pump outfitted with a device designed in accordance with the present invention.

In terms of this illustration, the pump casing (1), whose axis is represented by alternating dashes, rests upon the concrete slab (3) which seals the vessel containing liquid sodium (4) and an inert gas (15), such as argon, which is intended to prevent contact between the liquid sodium and the atmosphere.

The temperature of the aforementioned gas is, for example, as high as 400° C., whereas the external temperature on the upper portion of the slab (3) approximately 30° C. An impermeable seal (11) is situated between the component (5) which provides support for the pump and the pump casing, and there is an admissible difference in temperatures on either side of said seal, with no adverse effect upon tightness of the seal.

Nevertheless, it is necessary to limit convection movements within the aforementioned inert gas in order to prevent thermosiphon effects within the previously cited annular space (6), and it is obvious that the temperature which exists beneath said annular space (6) does not permit placement of a conventional impermeable seal in this location.

Accordingly, a floating ring (7) has been placed around the pump casing (1), and a disc (8) whose shape is congruent with the shape of the ring (7), has been fastened to the vertical wall (9). A thrust block (10) which is integral with the pump casing (1) is provided in order to prevent the floating ring from descending in the event of removal of the pump.

It is preferable for the aforementioned disc (8) to have the shape of a truncated cone, whereas the cross-section of the ring (7) should essentially have a trapezoidal shape, with the longer base resting upon the pump casing (1), while the lower side rests upon the surface of the disc (8), which has the shape of a truncated cone. In order to ensure maximum possible impermeability under these conditions, the generatrix for the surface having the shape of a truncated cone and the previously cited lower side are parallel to one another.

Consequently, the annular space (6) is sealed by means of an impermeable sealing device, as soon as the pump is positioned upon the supporting component (5), and thermosiphon effects within this particular space are extremely limited. From a practical viewpoint, if it is possible, without such a device, to observe temperature differentials as high as 200° C. along the pump casing, between two generatrices situated in diametrically opposite positions, the aforementioned dissymmetry is reduced to 30° by installing an inexpensive device of this type, and the pump casing (1) is no longer subject to significant loss of shape. Furthermore, this type of device is characterized by minimal volume, and it allows easy introduction and removal of the pump through the opening provided within the slab (3) for that purpose.

Although the illustration pertains to only one version of the present invention, it is obvious that any modifications introduced by technically knowledgeable persons would not constitute departures from the context of said invention.

We claim:

1. In a fast neutron nuclear reactor having a vessel containing liquid sodium, a slab covering said vessel, an opening in said slab having a pump therein, said opening having a vertical wall and said pump having a casing separated from said vertical wall by an annular space, said slab being spaced above said sodium, and an inert gas being provided between said slab and said sodium, a device for reducing thermosiphon effects in said annular space, said device comprising circumferential seal means extending continuously about said casing in said annular space for isolating a region above said seal means from a region below said seal means, said seal means including a ring body carried on and extending about said casing with substantial freedom of movement vertically along said casing and a disk that is stationary on said vertical wall, said ring body resting on said disk, and said ring body and said disk having mutually engaged surfaces of complementary shape.

2. A device in accordance with claim 1, wherein the surface of the disk engaged by the surface of the ring body has the shape of a truncated cone.

3. A device in accordance with claim 2, wherein the ring body has a trapezoidal cross-sectional with its base resting on said casing and with one side constituting the surface of the ring body that engages the disk, said surfaces being parallel with one another.

* * * * *